(12) United States Patent
Ren et al.

(10) Patent No.: US 11,044,134 B2
(45) Date of Patent: Jun. 22, 2021

(54) METHOD AND DEVICE OF ESTIMATING TIMING LOCATION OF ROUND TRIP TIME (71) Applicant: CHINA ACADEMY OF TELECOMMUNICATIONS TECHNOLOGY, Beijing (CN)

(72) Inventors: Bin Ren, Beijing (CN); Ren Da, Beijing (CN); Fang-Chen Cheng, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 92 days.

(21) Appl. No.: 16/499,276

(22) PCT Filed: Mar. 20, 2018

(86) PCT No.: PCT/CN2018/079598
§ 371 (c)(1),
(2) Date: Sep. 29, 2019

(87) PCT Pub. No.: WO2018/177160
PCT Pub. Date: Oct. 4, 2018

(65) Prior Publication Data
US 2021/0111939 A1 Apr. 15, 2021

(30) Foreign Application Priority Data
Apr. 1, 2017 (CN) .......................... 201710214517.4

(51) Int. Cl.
*H04L 5/00* (2006.01)
*H04L 27/26* (2006.01)
*H04W 74/08* (2009.01)
*H04J 13/00* (2011.01)

(52) U.S. Cl.
CPC ...... *H04L 27/2663* (2013.01); *H04J 13/0062* (2013.01); *H04W 74/0833* (2013.01)

(58) Field of Classification Search
CPC ..... H04L 25/02; H04L 27/2663; H04L 27/26; H04L 27/2662; H04L 27/2656;
(Continued)

(56) References Cited

U.S. PATENT DOCUMENTS

| | | | |
|---|---|---|---|
| 2006/0078040 A1* | 4/2006 | Sung | H04L 27/2684 375/140 |
| 2018/0310305 A1* | 10/2018 | Shao | H04W 72/042 |
| 2019/0036757 A1* | 1/2019 | Kilian | H04L 27/2675 |

FOREIGN PATENT DOCUMENTS

| | | |
|---|---|---|
| CN | 101039293 A | 9/2007 |
| CN | 101431492 A | 5/2009 |

(Continued)

OTHER PUBLICATIONS

CATT: "On NR RACH Preamble Design", 3GPP TSG RAN WG1 Meeting #88, R1-1702065, Athens, Greece, Feb. 13-17, 2017.
(Continued)

*Primary Examiner* — Mewale A Ambaye
(74) *Attorney, Agent, or Firm* — Kilpatrick Townsend & Stockton, LLP (57) ABSTRACT Disclosed in the present application is a method and a device of estimating a timing location. The method includes: for each preamble subsequence, acquiring a detection window in which a peak value of a correlation value power of each preamble subsequence is located; accumulating the correlation value powers of all corresponding locations in the acquired detection window of each preamble subsequence, to obtain a cumulative sum of the correlation value powers corresponding to each location, wherein, in the accumulation, the correlation value powers of the preamble subsequence are within detection window in which peak values of respective correlation value powers are located; determining, according to the cumulative sum of the correlation value powers, peak power and noise power; and estimating,
(Continued)

according to the peak power and the noise power, a timing location. The present application can solver the problem of a current M-stage preamble sequence solution in which a larger large frequency offset greatly impacts timing location estimation precision.

17 Claims, 6 Drawing Sheets

(58) Field of Classification Search
CPC ........... H04L 25/03159; H04L 27/2614; H04L 5/0078; H04L 67/18; H04L 7/007; H04W 74/0866
See application file for complete search history.

(56) References Cited

FOREIGN PATENT DOCUMENTS

| CN | 101667908 | A  | 3/2010  |
|----|-----------|----|---------|
| CN | 102316601 | A  | 1/2012  |
| CN | 102347924 | A  | 2/2012  |
| CN | 104135774 | A  | 11/2014 |
| EP | 2439973   | A1 | 4/2012  |
| WO | 2009155882| A1 | 12/2009 |

OTHER PUBLICATIONS

Felipe A. P. de Figueiredo et al, "Multi-Stage Based Cross-Correlation Peak Detection for LTE Random Access Preambles", Convergent Networks Department, Research and Development Center, Campinas, SP—Brazil, Oct. 2013.

Huawei, HiSilicon; "RACH preamble design for NR"; 3GPP TSG RAN WG1 NR Ad Hoc Meeting; R1-1700034; Spokane, USA, Jan. 16-20, 2017.

CATT; "On NR RACH Preamble Design"; 3GPP TSG RAN WG1 AH_NR Meeting; R1-1700184; Spokane, USA, Jan. 16-20, 2017.

* cited by examiner

METHOD AND DEVICE OF ESTIMATING TIMING LOCATION OF ROUND TRIP TIME

The application is a US National Stage of International Application No. PCT/CN2018/079598, filed Mar. 20, 2018, designating the United States, and claiming the priority from Chinese Patent Application No. 201710214517.4, filed with the Chinese Patent Office on Apr. 1, 2017 and entitled "Method and Device of Estimating Timing Location", which is hereby incorporated by reference in its entirety.

FIELD OF INVENTION

The present application relates to the field of wireless communication technologies and particularly to a method and a device of estimating a timing location.

BACKGROUND

In the study of the NR (New Radio) PRACH (Physical Random Access Channel) preamble sequence of the 5G ($5^{th}$ Generation) mobile communication system, the designing scheme of the multi-stage (M-stage) preamble sequence is proposed in order to improve the detection performance of the preamble and reduce the collision probability of the short preamble sequence. Here, one M-stage preamble sequence consists of M preamble subsequences and used for one random-access Msg1 transmission. The UE (User Equipment) selects one M-stage preamble sequence from a set of predefined or network-configured M-stage preamble sequences, and transmits it over the single network-configured time-frequency resource. The network (gNB (next generation NodeB)/TRP (Transmission and Reception Point)) will detect the M preamble subsequences contained in the M-stage preamble sequence respectively over the time-frequency resources. The M-stage preamble sequence is detected correctly only if the M preamble subsequences are all detected correctly.

Figure 1:
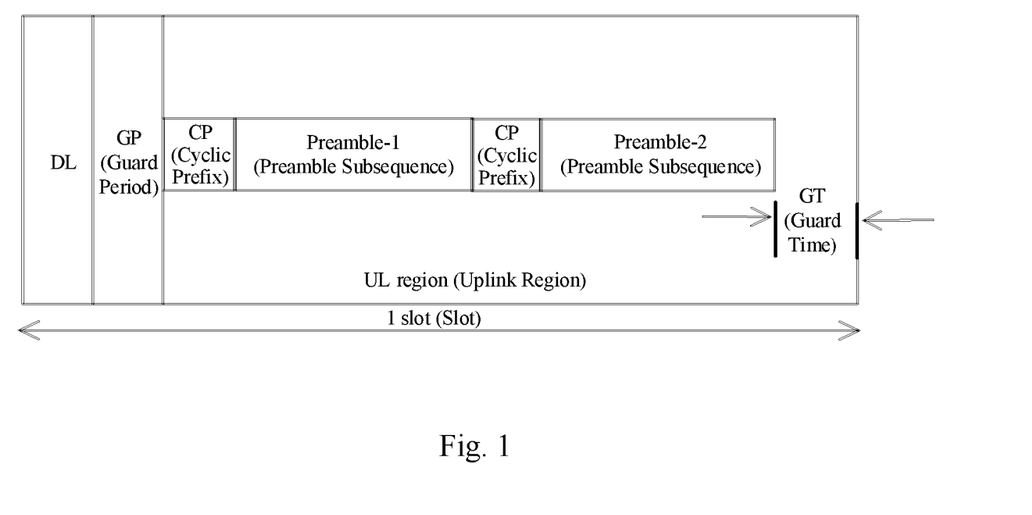
FIG. 1 is a schematic diagram of the designing scheme of the NR-PRACH M-stage preamble sequence when M=2 in the background art.

FIG. 1 is a schematic diagram of the designing scheme of the NR-PRACH M-stage preamble sequence when M=2, and FIG. 1 shows an example of the designing scheme of the M-stage preamble sequence, wherein M=2, that is, one 2-stage preamble sequence consists of a combination of two preamble subsequences (denoted by Preamble-1 and Preamble-2 in the figure). Each of the two successive preamble subsequences (Preamble-1 and Preamble-2) has the respective CP (Cyclic Prefix), and the GT (Guard Time) is reserved at the end of the 2-stage preamble sequence. Each preamble subsequence is selected by the UE to obtain one 2-stage preamble sequence, and transmitted as the Msg1, which is detected respectively at the network side. The 2-stage preamble sequence is detected correctly only if the 2 preamble subsequences are both detected correctly.

The PRACH root sequence uses the ZC (Zadoff-Chu) sequence as the root sequence (ZC root sequence for short below). Since the precursor sequences of each cell are generated by the ZC root sequence through the Ncs (cyclic shift, i.e., zero correlation zone configuration), the number of the preamble sequences of each cell is 64 and the preamble sequence used by the UE is selected randomly or allocated by the gNB (next generation NodeB), there is a need to plan the ZC root sequence index correctly in order to reduce the too large interference of the preamble sequences between the adjacent cells. The purpose of the planning is to allocate a ZC root sequence index to the cells so as to ensure that the preamble sequences generated by the adjacent cells using this index are different, to thereby reduce the mutual interference produced by the adjacent cells using the same preamble sequence.

The root index value is defined as the Zadoff-Chu (ZC sequence) of $u^{th}$, as shown by the formula of:

$$x_u(n) = e^{-j\frac{\pi un(n+1)}{N_{ZC}}}, 0 \le n \le N_{ZC} - 1 \quad (1)$$

wherein $N_{ZC}$ represents the length of the ZC sequence, u represents the root index value of the ZC sequence, j=sqrt(−1), and n represents the sequence element index. The random access preamble is obtained by the cyclic shifting of the ZC sequence of which the root index value is $u^{th}$, as shown by the formula of:

$$x_{u,v}(n) = x_u((n+C_v) \bmod N_{ZC}) \quad (2)$$

wherein $C_v$ represents the cyclic shifting value, $C_v = vN_{cs}$, v represents the $v^{th}$ cyclic shifting Ncs, and the value range of v is 0, 1, ..., $\lfloor N_{ZC}/N_{CS} \rfloor$, wherein $\lfloor \cdot \rfloor$ represents the rounding down.

Figure 2:
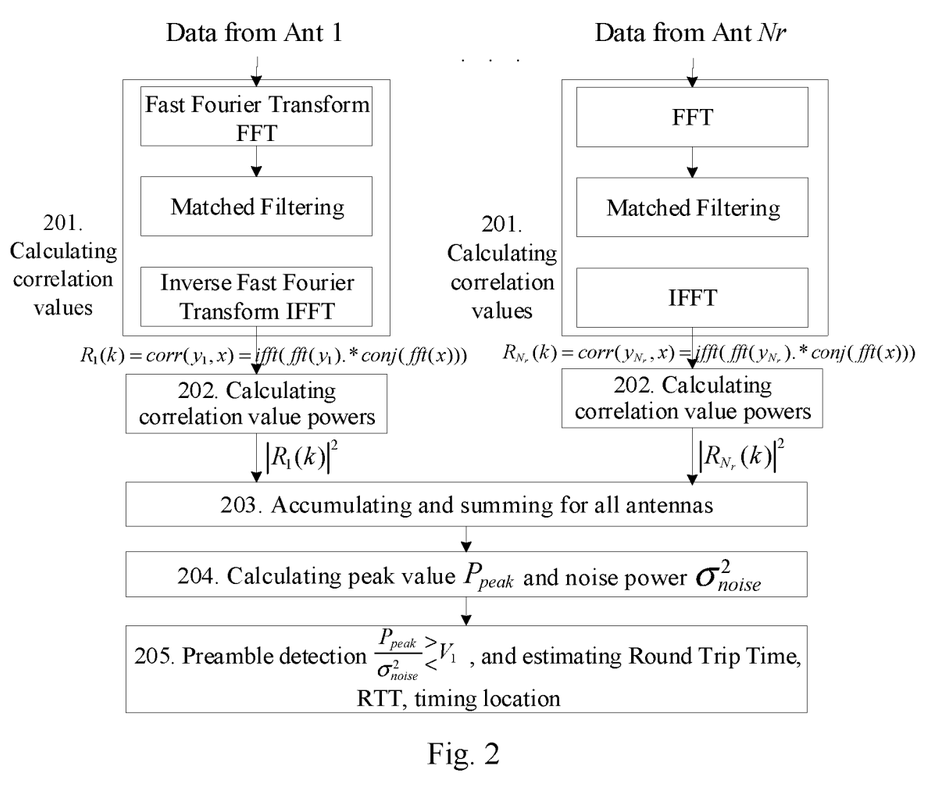
FIG. 2 is a schematic diagram of the existing LTE preamble detection algorithm in the background art.

FIG. 2 is a schematic diagram of the LTE preamble detection algorithm in the prior art, and as shown in FIG. 2, the main steps of the LTE preamble detection algorithm in the prior art are as follows:

Step 201: calculating the correlation values of the local preamble sequences and the received signals on all the receiving antennas, which is generally implemented by using the frequency-domain FFT (Fast Fourier Transform) multiplication method, as shown by the formula of:

$$R_1(k) = \text{corr}(y_1, x) = \text{ifft}(\text{fft}(y_1).*\text{conj}(\text{fft}(x))) \quad (3)$$

Step 202: calculating the correlation value powers $|R_1(k)|^2$ on all the receiving antennas;

Step 203: accumulating and summing for all the antennas;

Step 204: calculating the peak value $P_{peak}$ of the correlation value power, and estimating the noise power $\sigma_{noise}^2$;

Step 205: judging based on the ratio $D_{cor}$ of the peak value of the correlation value power to the noise power and the predefined threshold value $V_1$, judging a preamble is transmitted if $D_{cor}$ is greater than or equal to $V_1$ and obtaining the timing position $\tau_{peak}$ of the RTT (Round Trip Time) according to the position estimation of the peak value $P_{peak}$; and judging no preamble is transmitted if $D_{cor}$ is less than $V_1$;

$$D_{cor} = \frac{P_{peak}}{\sigma_{noise}^2}. \quad (4)$$

The deficiencies of the prior art include:

1. the current M-stage preamble sequence scheme has the problem of the larger influence on the estimation accuracy of the timing position in the case of the larger frequency offset;

2. As can be seen from the signal processing theory, the frequency deviation (i.e., frequency offset) has a certain effect on the estimation accuracy of the timing position. If there is a large frequency offset between the received preamble and the local preamble, the self-correlative peak value may provide the imprecise PRACH timing position estimation. That is, TA=TA_real+dT, where dT is the error of the timing position estimation caused by the frequency offset.

BRIEF SUMMARY

The present application provides a method and a device of estimating a timing location, so as to solve the problem that the current M-stage preamble sequence scheme has a larger effect on the estimation accuracy of the timing position in the case of the larger frequency offset.

In a first aspect, an embodiment of the present application provides a method of estimating a timing location, which includes:

obtaining, for each preamble subsequence, a detection window where a peak value of a correlation value power of each preamble subsequence is located;

accumulating correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;

determining a peak power and a noise power according to the cumulative sum of the correlation value powers;

estimating the timing location according to the peak power and the noise power.

Optionally, the obtaining a detection window where a peak value of a correlation value power of each preamble subsequence is located, further includes:

obtaining a detection window where a peak value of a correlation value power of each preamble subsequence is located after estimating a Round Trip Time, RTT, timing location.

Optionally, the accumulating the correlation value powers of all corresponding positions in the detection window obtained of each preamble subsequence to obtain the cumulative sum of the correlation value powers corresponding to each position, includes:

if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, $1 \leq k \leq Ncs$, and Ncs is the length of the detection window.

In a second aspect, an embodiment of the present application provides a device of estimating a timing location, which includes:

a detection window determining module configured to obtain, for each preamble subsequence, a detection window where a peak value of a correlation value power of each preamble subsequence is located;

a correlation value power cumulative sum module configured to accumulate correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;

a power determining module configured to determine a peak power and a noise power according to the cumulative sum of the correlation value powers;

a timing location estimating module configured to estimate the timing location according to the peak power and the noise power.

Optionally, the detection window determining module is further configured to:

obtain a detection window where a peak value of a correlation value power of each preamble subsequence is located after estimating a Round Trip Time, RTT, timing location.

Optionally, the correlation value power cumulative sum module is further configured so that when accumulating the correlation value powers of all corresponding positions in the detection window obtained of each preamble subsequence to obtain the cumulative sum of the correlation value powers corresponding to each position, if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, $1 \leq k \leq Ncs$, and Ncs is the length of the detection window.

The present application has the following beneficial effects.

In the technical solution provided by the embodiments of the present application, the peak power and the noise power for determining the timing position are derived from the cumulative sum of the self-correlation value powers while the cumulative sum of the correlation value powers is the cumulative sum of the correlation value powers of all the preamble subsequences, where for each preamble subsequence, this value is derived from the correlation value power of each preamble subsequence within the detection window where the peak value of the respective correlation value power is located, so the peak power and the noise power for determining the timing position has corrected the error caused by the frequency offset. Therefore, with this solution, the problem that the current M-stage preamble sequence scheme has a larger effect on the estimation accuracy of the timing position in the case of the larger frequency offset can be solved.

The present application provides a method and a device of estimating a timing location, so as to solve the problem that the self-correlative peak value may provide the imprecise PRACH timing position estimation when there is the large frequency offset between the received preamble and the local preamble.

In a third aspect, an embodiment of the present application provides a method of estimating a timing location, which includes:

estimating the timing location TA of each preamble subsequence according to a peak value of a correlation value power and a noise power detected;

determining a root index value u and a normalized frequency offset df of each preamble subsequence;

determining a timing position estimation error dT caused by the frequency offset according to the normalized frequency offset df and the root index value u of each preamble subsequence;

determining a real timing position TA_real according to the timing location TA and the timing position estimation error dT of each preamble subsequence.

Optionally, the root index value u is configured at the network side.

Optionally, determining a timing position estimation error dT caused by the frequency offset according to the normalized frequency offset df and the root index value u of each preamble subsequence by way of:

dT(m)=df/u(m), wherein dT(m) is the timing position estimation error of the $m^{th}$ preamble subsequence, and u(m) is the root index value of the $m^{th}$ preamble subsequence.

Optionally, when dT(m)=df/u(m), the mod(N_ZC) operation is omitted according to the ZC sequence characteristics.

Optionally, the method further includes:

solving dT(m) jointly according to the relationship of K TA(m) values and the root index value u when the preamble sequence contains M preamble subsequences, wherein M.

In a fourth aspect, an embodiment of the present application provides a device of estimating a timing location, which includes:

a timing location detecting module configured to estimate the timing location TA of each preamble subsequence according to a peak value of a correlation value power and a noise power detected;

a index value and frequency offset module configured to determine a root index value u and a normalized frequency offset df of each preamble subsequence;

a timing position estimation error module configured to determine a timing position estimation error dT caused by the frequency offset according to the normalized frequency offset df and the root index value u of each preamble subsequence;

a real timing position module configured to determine a real timing position TA_real according to the timing location TA and the timing position estimation error dT of each preamble subsequence.

Optionally, the index value and frequency offset module is further configured to use the root index value u configured at the network side.

Optionally, the timing position estimation error module is further configured to determine a timing position estimation error dT caused by the frequency offset according to the normalized frequency offset df and the root index value u of each preamble subsequence by way of:

dT(m)=df/u(m), wherein dT(m) is the timing position estimation error of the $m^{th}$ preamble subsequence, and u(m) is the root index value of the $m^{th}$ preamble subsequence.

Optionally, the timing position estimation error module is further configured to omit the mod(N_ZC) operation according to the ZC sequence characteristics when dT(m)=df/u(m).

Optionally, the timing position estimation error module is further configured to solve dT(m) jointly according to the relationship of K TA(m) values and the root index value u when the preamble sequence contains M preamble subsequences, wherein In a fifth aspect, an embodiment of the present application provides a device of estimating a timing location, which includes:

a processor configured to read programs in a memory to perform processes of:

obtaining, for each preamble subsequence, a detection window where a peak value of a correlation value power of each preamble subsequence is located;

accumulating correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;

determining a peak power and a noise power according to the cumulative sum of the correlation value powers;

estimating the timing location according to the peak power and the noise power;

a transceiver configured to receive and transmit data under the control of the processor to perform processes of:

receiving and transmitting the data according to the processor's requirement.

Optionally, the processor is further configured to:

obtain a detection window where a peak value of a correlation value power of each preamble subsequence is located after estimating a Round Trip Time, RTT, timing location.

Optionally, the processor is further configured so that when accumulating correlation value powers of all corresponding positions in the detection window obtained of each preamble subsequence to obtain a cumulative sum of the correlation value powers corresponding to each position, if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, $1 \leq k \leq Ncs$, and Ncs is the length of the detection window.

In a sixth aspect, an embodiment of the present application provides a device of estimating a timing location, which includes:

a processor configured to read programs in a memory to perform processes of:

estimating the timing location TA of each preamble subsequence according to a peak value of a correlation value power and a noise power detected;

determining a root index value u and a normalized frequency offset df of each preamble subsequence;

determining a timing position estimation error dT caused by the frequency offset according to the normalized frequency offset df and the root index value u of each preamble subsequence;

determining a real timing position TA_real according to the timing location TA and the timing position estimation error dT of each preamble subsequence;

a transceiver configured to receive and transmit data under the control of the processor to perform processes of:

receiving and transmitting the data according to the processor's requirement.

Optionally, the root index value u is configured at the network side.

Optionally, the processor is further configured to determine a timing position estimation error dT caused by the frequency offset according to the normalized frequency offset df and the root index value u of each preamble subsequence by way of:

dT(m)=df/u(m), wherein dT(m) is the timing position estimation error of the $m^{th}$ preamble subsequence, and u(m) is the root index value of the $m^{th}$ preamble subsequence.

Optionally, the processor is further configured to omit the mod(N_ZC) operation according to the ZC sequence characteristics when dT(m)=df/u(m).

Optionally, the processor is further configured to solve dT(m) jointly according to the relationship of K TA(m) values and the root index value u when the preamble sequence contains M preamble subsequences, wherein 2≤K≤M.

In a seventh aspect, an embodiment of the present application provides a readable storage medium of a cache synchronization exception device, including the program codes which are configured, when running on a computing device, to cause the computing device to perform any solution of the first aspect or any solution of the third aspect described above.

The present application has the following beneficial effects.

In the technical solutions provided by the embodiments of the present application, for the timing position estimation error between the real timing position and the measured timing position, since the timing position estimation error caused by the frequency offset is determined by using the normalized frequency offset df and the root index value u according to the ZC sequence characteristics, the problem that the self-correlative peak value may provide the imprecise PRACH timing position estimation when there is the large frequency offset between the received preamble and the local preamble can be solved.

BRIEF DESCRIPTION OF THE DRAWINGS

The accompanying drawings illustrated here are used to provide the further understanding of the present application and constitute a part of the present application, and the schematic embodiments of the present application and the illustration thereof are used to explain the present application but not limit the present application improperly. In the accompanying drawings.

DETAILED DESCRIPTION OF THE EMBODIMENTS

The embodiments of the present application will provide a detection scheme of the M-stage preamble sequence, so as to solve the problem of the lower timing position estimation precision in the case of the larger frequency offset. For the first point: the problem that the current M-stage preamble sequence scheme has a larger effect on the estimation precision of the timing position in the case of the larger frequency offset, the first solution will be provided in the embodiments to solve this problem; and for the second point: the problem that the self-correlative peak value may provide the imprecise PRACH timing position estimation if there is a large frequency offset between the received preamble and the local preamble, the second solution will be provided in the embodiments to solve this problem. The specific embodiments of the present application will be illustrated below in combination with the drawings.

First Solution.

Figure 3:
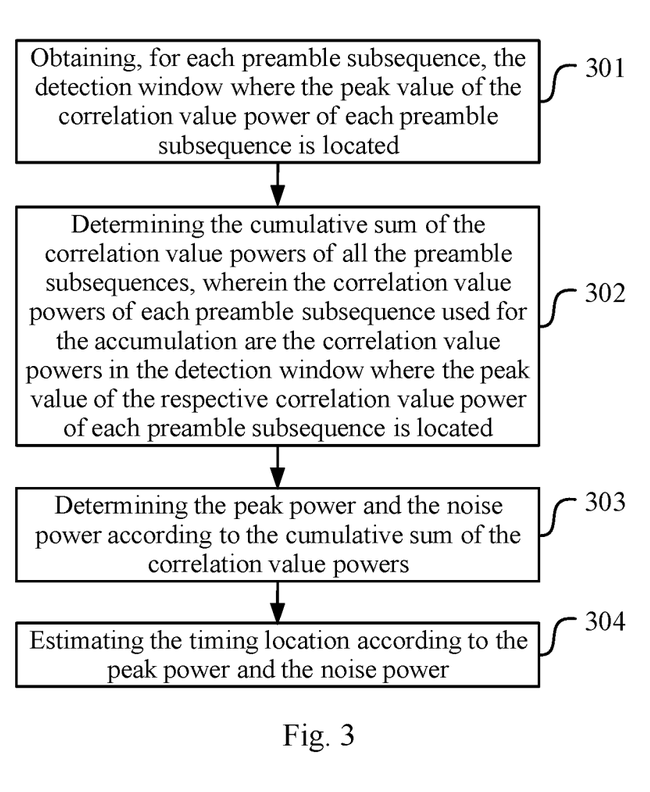
FIG. 3 is a schematic diagram of an implementation process of a first method of estimating a timing location in an embodiment of the present application.

FIG. 3 is a schematic diagram of an implementation process of a first method of estimating a timing location, and as shown, the first method can includes:

Step 301: obtaining, for each preamble subsequence, the detection window where the peak value of the correlation value power of each preamble subsequence is located;

Step 302: accumulating the correlation value powers of all the corresponding positions in the detection window obtained of each preamble subsequence to obtain the cumulative sum of the correlation value powers corresponding to each position, wherein the correlation value powers of each preamble subsequence used for the accumulation are the correlation value powers in the detection window where the peak value of the respective correlation value power is located;

Step 303: determining the peak power and the noise power according to the cumulative sum of the correlation value powers;

Step 304: estimating the timing location according to the peak power and the noise power.

Optionally, the detection window where the peak value of the correlation value power of each preamble subsequence is located is obtained after the Round Trip Time, RTT, timing location is estimated.

In an implementation, the accumulating the correlation value powers of all the corresponding positions in the detection window obtained of each preamble subsequence to obtain the cumulative sum of the correlation value powers corresponding to each position, includes:

if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, 1≤k≤Ncs, and Ncs is the length of the detection window.

Assuming that the M-stage preamble sequence contains M preamble subsequences, the specific implementation can be as follows.

Figure 4:
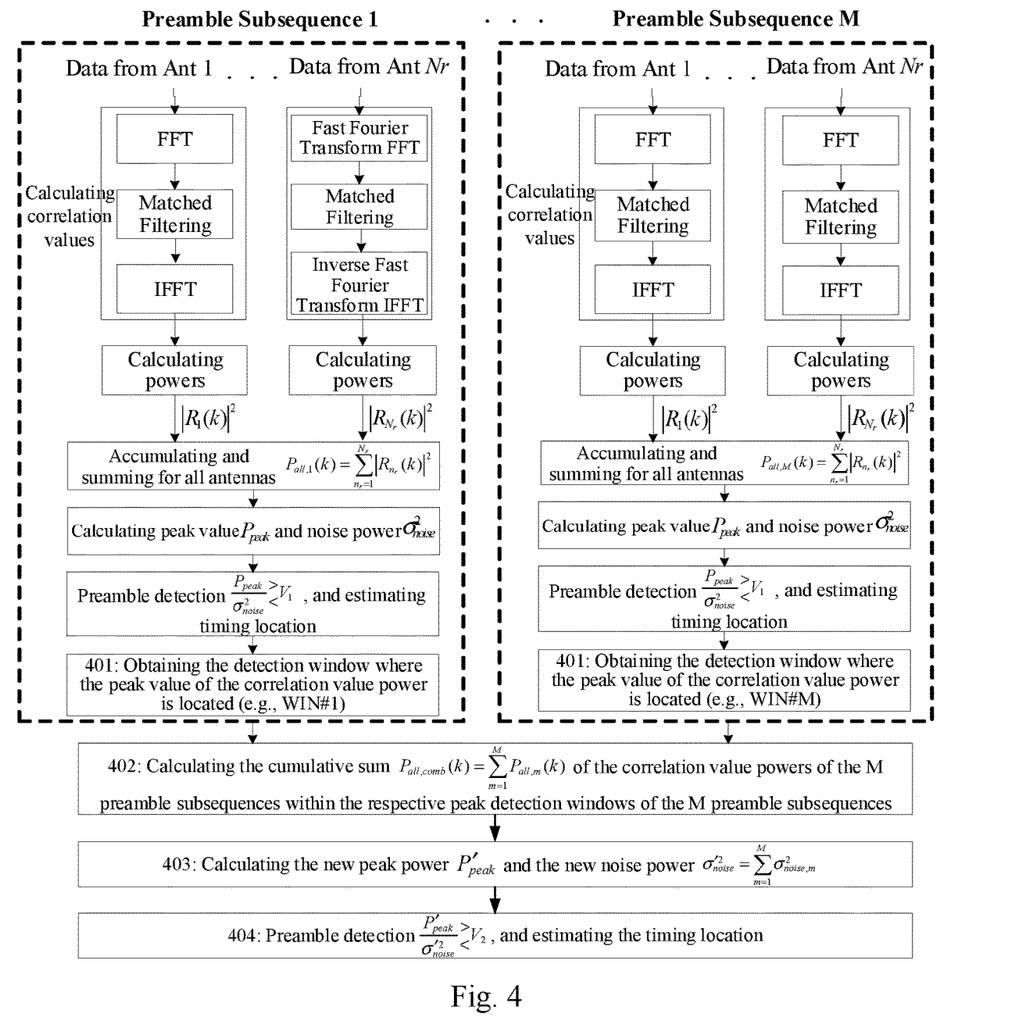
FIG. 4 is a schematic diagram of a method of estimating the timing location detected jointly based on M preamble subsequences in an embodiment of the present application.

FIG. 4 is a schematic diagram of a method of estimating the timing location detected jointly based on M preamble subsequences, and as shown, the method can be as follows.

Each preamble subsequence is processed by using the LTE preamble detection algorithm as shown in FIG. 2.

Step 401: obtaining the detection window where the peak value of the correlation value power is located.

Specifically, for example, the detection window corresponding to the $m^{th}$ preamble subsequence is WIN#m of which the length is Ncs.

Step 402: calculating the cumulative sum of the correlation value powers of the M preamble subsequences within the respective peak detection windows, which is as follows:

$$P_{all,comb}(k) = \sum_{m=1}^{M} P_{all,m}(k) \quad (5)$$

wherein $P_{all,m}(k)$ represents the correlation value power of the $k^{th}$ sample value of the detection window where the $m^{th}$ preamble subsequence is located, and $1 \leq k \leq Ncs$.

Step 403: calculating the new peak power $P'_{peak}$ of the correlation value and the new noise power $$\sigma'^{2}_{noise} = \sum_{m=1}^{M} \sigma^{2}_{noise,m}.$$

Step 404: performing the preamble detection $$\frac{P'_{peak}}{\sigma'^{2}_{noise}} \begin{array}{c} > \\ < \end{array} V_2,$$

and estimating the timing location.

Specifically, it is judged based on the ratio $D'_{cor}$ of the peak value of the correlation value power to the noise power and the predefined threshold value $V_2$. It is judged that a preamble is transmitted and the timing location $\tau'_{peak}$ is estimated if $D'_{cor}$ is greater than $V_2$; and it is judged that no preamble is transmitted if $D'_{cor}$ is less than $V_2$;

$$D'_{cor} = \frac{P'_{peak}}{\sigma'^{2}_{noise}}. \quad (6)$$

The following description is made based on the instance of two 2-stage preamble subsequences.

Figure 5:
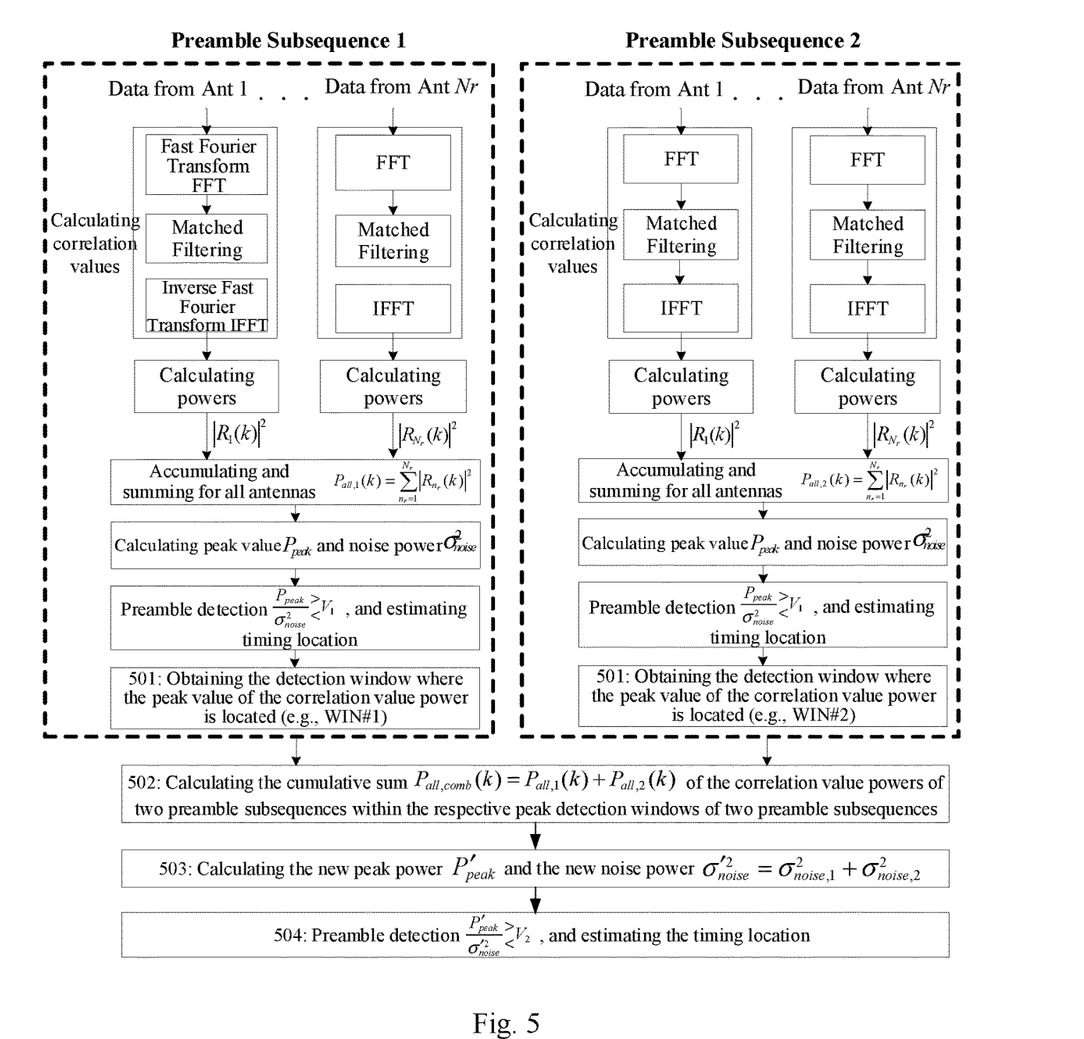
FIG. 5 is a schematic diagram of a method of estimating the timing location detected jointly based on two 2-stage preamble subsequences in an embodiment of the present application.

FIG. 5 is a schematic diagram of a method of estimating the timing location detected jointly based on two 2-stage preamble subsequences, and as shown, the method can be as follows.

The preamble subsequences #1 and #2 are processed by using the LTE preamble detection algorithm as shown in FIG. 2.

Step 501: obtaining the detection window where the peak value of the correlation value power is located.

For example, the corresponding detection windows obtained respectively by the preamble subsequences #1 and #2 are WIN #1 and WIN #2 of which the length is Ncs.

Step 502: calculating the cumulative sum of the correlation value powers of two preamble subsequences within the respective peak detection windows:

$$P_{all,comb}(k) = P_{all,1}(k) + P_{all,2}(k) \quad (9)$$

wherein $P_{all,1}(k)$ and $P_{all,2}(k)$ represent the correlation value powers of the $k^{th}$ sample value s of the detection windows where the preamble subsequences #1 and #2 are located respectively, and $1 \leq k \leq Ncs$.

Step 503: calculating the new peak power $P'_{peak}$ of the correlation value and the new noise power $\sigma'^{2}_{noise} = \sigma^{2}_{noise,1} + \sigma^{2}_{noise,2}$.

Step 504: performing the preamble detection $$\frac{P'_{peak}}{\sigma'^{2}_{noise}} \begin{array}{c} > \\ < \end{array} V_2,$$

and estimating the timing location.

Specifically, it is judged based on the ratio $D'_{cor}$ of the peak value of the correlation value power to the noise power and the predefined threshold value $V_2$. The timing location $\tau'_{peak}$ is estimated if $D'_{cor}$ is greater than or equal to $V_2$; and it is judged that no preamble is transmitted if $D'_{cor}$ is less than $V_2$;

$$D'_{cor} = \frac{P'_{peak}}{\sigma'^{2}_{noise}}. \quad (10)$$

Based upon the same inventive concept, an embodiment of the present application further provides a device of estimating a timing location. Since the principle solving the problem of this device is similar to the method of estimating the timing location, the implementations of this device can refer to the implementations of the method, and the repeated description thereof will be omitted here.

Figure 6:
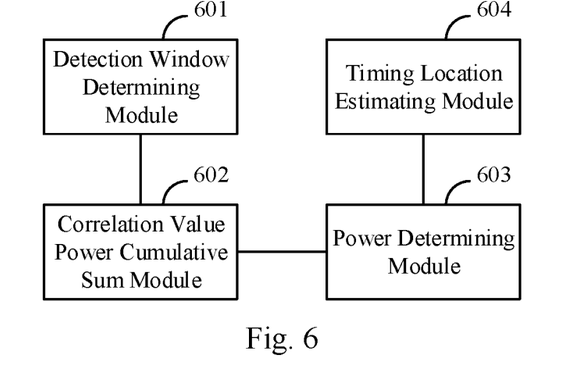
FIG. 6 is a structural schematic diagram of a first device of estimating a timing location in an embodiment of the present application.

FIG. 6 is a structural schematic diagram of a first device of estimating a timing location, and as shown, the first device can includes:

a detection window determining module 601 configured to obtain, for each preamble subsequence, the detection window where the peak value of the correlation value power of each preamble subsequence is located;

a correlation value power cumulative sum module 602 configured to accumulate the correlation value powers of all the corresponding positions in the detection window obtained of each preamble subsequence to obtain the cumulative sum of the correlation value powers corresponding to each position, wherein the correlation value powers of each preamble subsequence used for the accumulation are the correlation value powers in the detection window where the peak value of the respective correlation value power is located;

a power determining module 603 configured to determine the peak power and the noise power according to the cumulative sum of the correlation value powers;

a timing location estimating module 604 configured to estimate the timing location according to the peak power and the noise power.

Optionally, the detection window determining module 601 is further configured to:

obtain a detection window where a peak value of a correlation value power of each preamble subsequence is located after estimating a Round Trip Time, RTT, timing location.

In an implementation, the correlation value power cumulative sum module is further configured so that when accumulating correlation value powers of all corresponding positions in the detection window obtained of each preamble subsequence to obtain the cumulative sum of the correlation value powers corresponding to each position, if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, $1 \le k \le Ncs$, and Ncs is the length of the detection window.

When the technical solution provided by the embodiment of the present application is implemented, it can be implemented in such way as follows.

Figure 7:
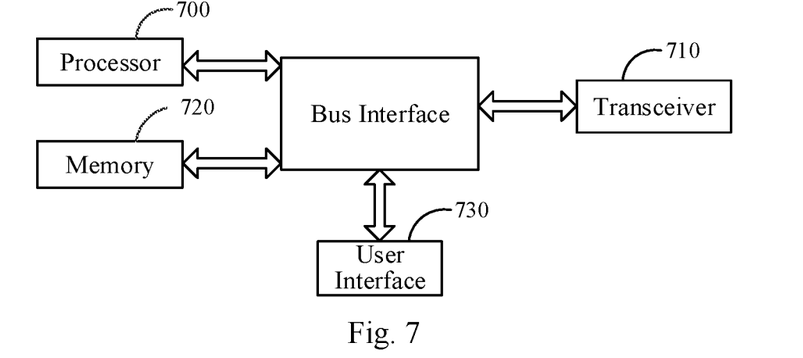
FIG. 7 is a structural schematic diagram of a first terminal in an embodiment of the present application.

FIG. 7 is a structural schematic diagram of a first terminal, and as shown, the terminal includes:

a processor 700 configured to read the programs in a memory 720 to perform the processes of:
 obtaining, for each preamble subsequence, the detection window where the peak value of the correlation value power of each preamble subsequence is located;
 accumulating the correlation value powers of all the corresponding positions in the detection window obtained of each preamble subsequence to obtain the cumulative sum of the correlation value powers corresponding to each position, wherein the correlation value powers of each preamble subsequence used for the accumulation are the correlation value powers in the detection window where the peak value of the respective correlation value power is located;
 determining the peak power and the noise power according to the cumulative sum of the correlation value powers;
 estimating the timing location according to the peak power and the noise power;
a transceiver 710 configured to receive and transmit the data under the control of the processor 700 to perform the processes of:
 receiving and transmitting the data according to the processor's requirement.

Optionally, the processor 700 is further configured to:
 obtain the detection window where the peak value of the correlation value power of each preamble subsequence is located after estimating the RTT timing location.

In an implementation, the accumulating correlation value powers of all corresponding positions in the detection window obtained of each preamble subsequence to obtain a cumulative sum of the correlation value powers corresponding to each position, includes:
 if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents the correlation value power of the $k^{th}$ sample value of the detection window where the $m^{th}$ preamble subsequence is located, $1 \le k \le Ncs$, and Ncs is the length of the detection window.

Here, in FIG. 7, the bus architecture can include any numbers of interconnected buses and bridges, and specifically link various circuits of one or more processors represented by the processor 700 and the memory represented by the memory 720. The bus architecture can further link various other circuits such as peripheral device, voltage regulator and power management circuit, which are all well known in the art and thus will not be further described again herein. The bus interface provides an interface. The transceiver 710 can be a plurality of elements, i.e., include a transmitter and a receiver, and provide the units for communicating with various other devices over the transmission media. For different user equipments, the user interface 730 can also be the interface capable of inter-connecting or exter-connecting with the required devices, and the connected devices include but not limited to keypad, display, loudspeaker, microphone, joystick and the like.

The processor 700 is responsible for managing the bus architecture and general processing, and the memory 720 can store the data used by the processor 700 when performing the operations.

Second Solution.

Figure 8:
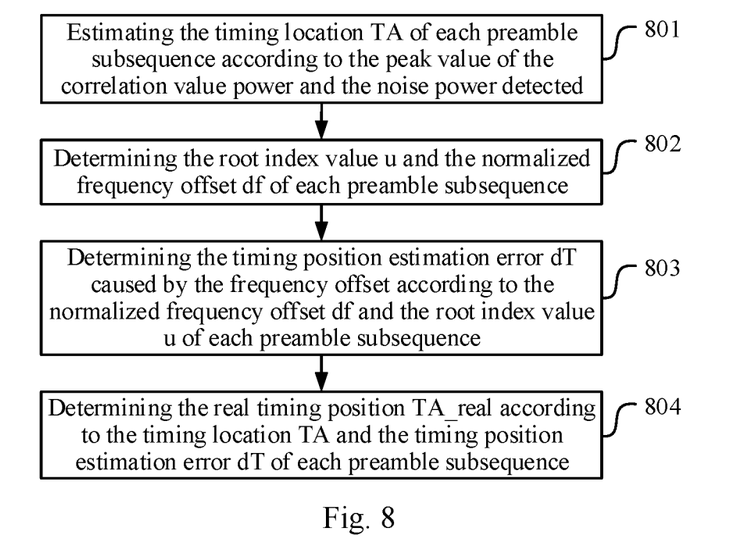
FIG. 8 is a schematic diagram of an implementation process of a second method of estimating a timing location in an embodiment of the present application.

FIG. 8 is a schematic diagram of an implementation process of a second method of estimating a timing location, and as shown, the second method can includes:

Step 801: estimating the timing location TA of each preamble subsequence according to the peak value of the correlation value power and the noise power detected;

Step 802: determining the root index value u and the normalized frequency offset df of each preamble subsequence;

Step 803: determining the timing position estimation error dT caused by the frequency offset according to the normalized frequency offset df and the root index value u of each preamble subsequence;

Step 804: determining the real timing position TA_real according to the timing location TA and the timing position estimation error dT of each preamble subsequence.

In an implementation, the root index value u is configured at the network side.

In an implementation, the timing position estimation error dT caused by the frequency offset can be determined according to the normalized frequency offset df and the root index value u of each preamble subsequence by way of:
 dT(m)=df/u(m), wherein dT(m) is the timing position estimation error of the $m^{th}$ preamble subsequence, and u(m) is the root index value of the $m^{th}$ preamble subsequence.

In an implementation, when dT(m)=df/u(m), the mod (N_ZC) operation is omitted according to the ZC sequence characteristics.

In an implementation, the method further includes:
 solving dT(m) jointly according to the relationship of K TA(m) values and the root index value u when the preamble sequence contains M preamble subsequences, wherein M.

Assuming that the M-stage preamble sequence contains M preamble subsequences, the specific implementation can be as follows:

Base Station Side:
 the base station configures M different root sequence index values u respectively, e.g., u(1), u(2), . . . , u(M).

Terminal Side:
 considering that the time interval occupied by the PRACH symbols is relatively short, it is assumed that the normalized frequency offsets of all the M preamble subsequences are the same and denoted as df; and the M preamble subsequences use different root sequence indexes u(1), u(2), . . . , u(M).

The LTE preamble detection algorithm as shown in FIG. 2 is used for the processing, and the estimated timing locations obtained respectively for the individual preamble subsequences are TA(1), TA(2), . . . , TA(M), which are represented by:

$$TA(m)=TA\_real+dT(m) \quad (7)$$

wherein TA_real is the real timing location, TA(m) is the timing position estimation error due to the normalized frequency offset df on the $m^{th}$ preamble subsequence, and $1 \leq m \leq M$.

As can be seen from the ZC sequence characteristics:

$$dT(m)=df/u(m) \quad (8)$$

wherein the mod(N_ZC) operation is omitted, and $1 \leq m \leq M$.

According to the formulas (7) and (8), dT(m) can be solved jointly by using the relationship of M TA(m) values and the root index value u, and subtracted from the formula (7), to obtain the real timing location TA_real which does not affected by the normalized frequency offset df.

At the same time, in order to reduce the processing complexity, dT(m) can be solved jointly by using the relationship of K TA(m) values and the root index value u.

The joint solving can be implemented in the way which is well known by those skilled in the art, e.g., by the method of solving the system of linear equations.

The following description is made based on the instance of the 2-stage preamble subsequences.

The implementation of the timing position estimation combining the 2-stage preamble subsequences with the ZC sequence characteristics will be illustrated in this example.

It is assumed that two 2-stage preamble subsequences have two root index values u1 and u2 respectively, and the TA estimations (denoted as TA1 and TA2) can be obtained by detecting the two preamble subsequences respectively, and include the estimation errors dT1 and dT2 caused by the same frequency offset df respectively. That is:

$$TA1=TA\_real+dT1$$

$$TA2=TA\_real+dT2 \quad (11)$$

wherein TA_real is the real timing location.

dT1 and dT2 can be obtained according to the ZC sequence characteristics dT1=df/u1, dT2=df/u2 as well as TA1 and TA2 obtained by the detection method as shown in FIG. 2:

$$dT1=(TA2-TA1)/(u1/u2-1)$$

$$dT2=dT1*u1/u2 \quad (12).$$

In an implementation, in formula (11), TA1 and TA2 are the known quantities calculated by FIG. 2, while TA_real, dT1 and dT2 are all the unknown quantities. Thus, dT1 and dT2 are calculated by the formula (12), and then substituted back into the formula (11) to obtain TA_real.

After dT1 and dT2 are obtained, the estimated value TA_real of the timing location which is more precise and not affected by the frequency offset df can be obtained by TA_real=TA1−dT1, TA_real=TA2−dT2 or TA_real=((TA1−dT1)+(TA2−dT2))/2.

Based upon the same inventive concept, an embodiment of the present application further provides a device of estimating a timing location. Since the principle solving the problem of this device is similar to the method of estimating the timing location, the implementations of this device can refer to the implementations of the method, and the repeated description thereof will be omitted here.

Figure 9:
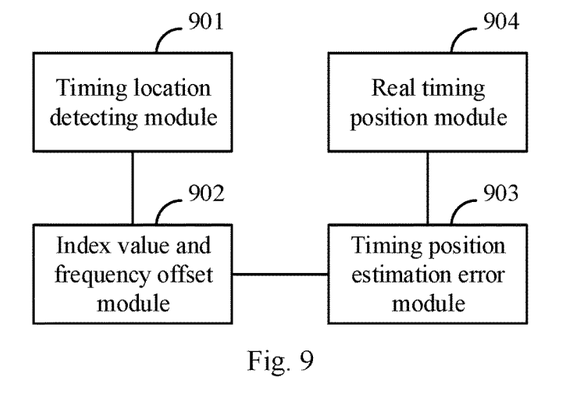
FIG. 9 is a structural schematic diagram of a second device of estimating a timing location in an embodiment of the present application.

FIG. 9 is a structural schematic diagram of a second device of estimating a timing location, and as shown, the second device can includes:

a timing location detecting module 901 configured to estimate the timing location TA of each preamble subsequence according to the peak value of the correlation value power and the noise power detected;

a index value and frequency offset module 902 configured to determine the root index value u and the normalized frequency offset df of each preamble subsequence;

a timing position estimation error module 903 configured to determine the timing position estimation error dT caused by the frequency offset according to the normalized frequency offset df and the root index value u of each preamble subsequence;

a real timing position module 904 configured to determine the real timing position TA_real according to the timing location TA and the timing position estimation error dT of each preamble subsequence.

In an implementation, the index value and frequency offset module is further configured to use the root index value u configured at the network side.

In an implementation, the timing position estimation error module is further configured to determine the timing position estimation error dT caused by the frequency offset according to the normalized frequency offset df and the root index value u of each preamble subsequence by way of:

dT(m)=df/u(m), wherein dT(m) is the timing position estimation error of the $m^{th}$ preamble subsequence, and u(m) is the root index value of the $m^{th}$ preamble subsequence.

In an implementation, the timing position estimation error module is further configured to omit the mod(N_ZC) operation according to the ZC sequence characteristics when dT(m)=df/u(m).

In an implementation, the timing position estimation error module is further configured to solve dT(m) jointly according to the relationship of K TA(m) values and the root index value u when the preamble sequence contains M preamble subsequences, wherein $2 \leq K \leq M$.

For the sake of description, all the parts of the above-mentioned device are divided into various modules or units by function, which are described respectively. Of course, the functions of the various modules or units can be implemented in the same one or more softwares or hardware when the present application is implemented.

When the technical solution provided by the embodiment of the present application is implemented, it can be implemented in such way as follows.

Figure 10:
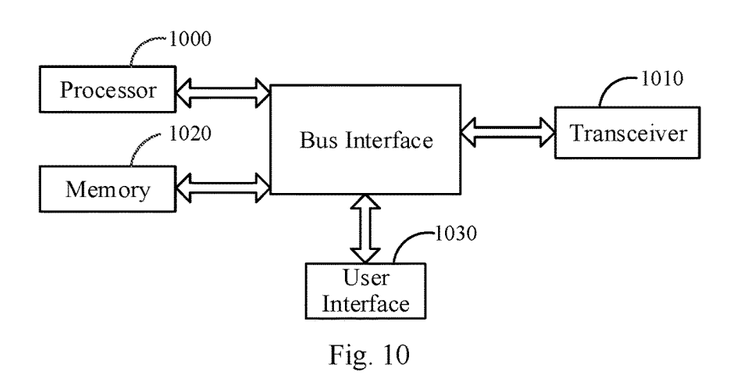
FIG. 10 is a structural schematic diagram of a second terminal in an embodiment of the present application.

FIG. 10 is a structural schematic diagram of a second terminal, and as shown, the terminal includes:

a processor 1000 configured to read the programs in a memory 1020 to perform the processes of:

estimating the timing location TA of each preamble subsequence according to the peak value of the correlation value power and the noise power detected;

determining the root index value u and the normalized frequency offset df of each preamble subsequence;

determining the timing position estimation error dT caused by the frequency offset according to the normalized frequency offset df and the root index value u of each preamble subsequence;

determining the real timing position TA_real according to the timing location TA and the timing position estimation error dT of each preamble subsequence;

a transceiver 1010 configured to receive and transmit the data under the control of the processor 1000 to perform the processes of:

receiving and transmitting the data according to the processor's requirement.

In an implementation, the root index value u is configured at the network side.

In an implementation, the timing position estimation error dT caused by the frequency offset is determined according to the normalized frequency offset df and the root index value u of each preamble subsequence by way of:

dT(m)=df/u(m), wherein dT(m) is the timing position estimation error of the $m^{th}$ preamble subsequence, and u(m) is the root index value of the $m^{th}$ preamble subsequence.

In an implementation, when dT(m)=df/u(m), the mod (N_ZC) operation is omitted according to the ZC sequence characteristics.

In an implementation, the processes further include:

solving dT(m) jointly according to the relationship of K TA(m) values and the root index value u when the preamble sequence contains M preamble subsequences, wherein 2≤K≤M.

Here, in FIG. 10, the bus architecture can include any numbers of interconnected buses and bridges, and specifically link various circuits of one or more processors represented by the processor 1000 and the memory represented by the memory 1020. The bus architecture can further link various other circuits such as peripheral device, voltage regulator and power management circuit, which are all well known in the art and thus will not be further described again herein. The bus interface provides an interface. The transceiver 1010 can be a plurality of elements, i.e., include a transmitter and a receiver, and provide the units for communicating with various other devices over the transmission media. For different user equipments, the user interface 1030 can also be the interface capable of inter-connecting or exter-connecting with the required devices, and the connected devices include but not limited to keypad, display, loudspeaker, microphone, joystick and the like.

The processor 1000 is responsible for managing the bus architecture and general processing, and the memory 1020 can store the data used by the processor 1000 when performing the operations.

An embodiment of the invention provides a readable storage medium, which is a non-volatile storage medium and includes the program codes which are configured, when running on a computing device, to cause the computing device to perform the actions of any one of the methods estimating the timing location described above.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A method of a device for estimating a timing location of Round Trip Time (RTT), the method comprises:

obtaining, for each preamble subsequence, a detection window where a peak value of a correlation value power of each preamble subsequence is located;

accumulating correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;

determining a peak power and a noise power according to the cumulative sum of the correlation value powers;

estimating the timing location of the Round Trip Time (RTT) according to the peak power and the noise power;

wherein the accumulating correlation value powers of all corresponding positions in the detection window obtained of each preamble subsequence to obtain a cumulative sum of the correlation value powers corresponding to each position, comprises:

if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents a correlation value power of a $k^{th}$ sample value of a detection window where an $m^{th}$ preamble subsequence is located, 1≤k≤Ncs, and Ncs is the length of the detection window.

2. The method of claim 1, wherein the obtaining a detection window where a peak value of a correlation value power of each preamble subsequence is located, further comprises:
  obtaining a detection window where a peak value of a correlation value power of each preamble subsequence is located after estimating the timing location.

3. A device of estimating a timing location of Round Trip Time (RTT), the device comprises:
  a detection window determining module configured to obtain, for each preamble subsequence, a detection window where a peak value of a correlation value power of each preamble subsequence is located;
  a correlation value power cumulative sum module configured to accumulate correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;
  a power determining module configured to determine a peak power and a noise power according to the cumulative sum of the correlation value powers;
  a timing location estimating module configured to estimate the timing location of the Round Trip Time (RTT) according to the peak power and the noise power;
  wherein the correlation value power cumulative sum module is further configured so that when accumulating correlation value powers of all corresponding positions in the detection window obtained of each preamble subsequence to obtain a cumulative sum of the correlation value powers corresponding to each position, if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents a correlation value power of a $k^{th}$ sample value of a detection window where an $m^{th}$ preamble subsequence is located, $1 \leq k \leq Ncs$, and Ncs is the length of the detection window.

4. The device of claim 3, wherein the detection window determining module is further configured to:
  obtain a detection window where a peak value of a correlation value power of each preamble subsequence is located after estimating the timing location.

5. A method of a device for estimating a timing location of Round Trip Time (RTT), the method comprises:
  estimating the timing location TA of each preamble subsequence according to a peak value of a correlation value power and a noise power detected;
  determining a root index value u and a normalized frequency offset df of each preamble subsequence;
  determining a timing position estimation error dT caused by the frequency offset according to the normalized frequency offset df and the root index value u of each preamble subsequence;
  determining a real timing position TA_real according to the timing location TA of the round trip time (RTT) and the timing position estimation error dT of each preamble subsequence.

6. The method of claim 5, wherein the root index value u is configured at a network side.

7. The method of claim 5, wherein determining a timing position estimation error dT caused by the frequency offset according to the normalized frequency offset df and the root index value u of each preamble subsequence by way of:
  $dT(m)=df/u(m)$, wherein $dT(m)$ is a timing position estimation error of an $m^{th}$ preamble subsequence, and $u(m)$ is a root index value of the $m^{th}$ preamble subsequence.

8. The method of claim 7, wherein when $dT(m)=df/u(m)$, mod(N_ZC) operation is omitted according to ZC sequence characteristics.

9. The method of claim 5, further comprises:
  solving $dT(m)$ jointly according to the relationship of K TA(m) values and the root index value u when a preamble sequence includes M preamble subsequences, wherein $2 \leq K \leq M$.

10. A device of estimating a timing location of Round Trip Time (RTT), the device comprises:
  a timing location detecting module configured to estimate the timing location TA of each preamble subsequence according to a peak value of a correlation value power and a noise power detected;
  a index value and frequency offset module configured to determine a root index value u and a normalized frequency offset df of each preamble subsequence;
  a timing position estimation error module configured to determine a timing position estimation error dT caused by the frequency offset according to the normalized frequency offset df and the root index value u of each preamble subsequence;
  a real timing position module configured to determine a real timing position TA of the Round Trip Time (RTT) real according to the timing location TA and the timing position estimation error dT of each preamble subsequence.

11. A device of estimating a timing location of Round Trip Time (RTT), the device comprises:
  a processor configured to read programs in a memory to perform processes of:
    obtaining, for each preamble subsequence, a detection window where a peak value of a correlation value power of each preamble subsequence is located;
    accumulating correlation value powers of all corresponding positions in the detection window obtained of each preamble subsequence to obtain a cumulative sum of the correlation value powers corresponding to each position, wherein the correlation value powers of each preamble subsequence used for the accumulation are correlation value powers in a detection window where a peak value of a respective correlation value power of each preamble subsequence is located;
    determining a peak power and a noise power according to the cumulative sum of the correlation value powers;
    estimating the timing location of the Round Trip Time (RTT) according to the peak power and the noise power;
  a transceiver configured to receive and transmit data under the control of the processor to perform processes of:
    receiving and transmitting data according to a requirement of the processor;

wherein the processor is further configured so that when accumulating correlation value powers of all corresponding positions in the detection window obtained of each preamble subsequence to obtain a cumulative sum of the correlation value powers corresponding to each position, if there are M preamble subsequences, the cumulative sum of the correlation value powers of the M preamble subsequences is:

$$P_{all,comb}(k) = \sum_{m=1}^{M} P_{all,m}(k),$$

wherein $P_{all,m}(k)$ represents a correlation value power of a $k^{th}$ sample value of a detection window where an $m^{th}$ preamble subsequence is located, $1 \leq k \leq Ncs$, and Ncs is the length of the detection window.

12. The device of claim 11, wherein the processor is further configured to:
obtain a detection window where a peak value of a correlation value power of each preamble subsequence is located after estimating the timing location.

13. A device of estimating a timing location of Round Trip Time (RTT), the device comprises:
a processor configured to read programs in a memory to perform processes of:
estimating the timing location TA of each preamble subsequence according to a peak value of a correlation value power and a noise power detected;
determining a root index value u and a normalized frequency offset df of each preamble subsequence;
determining a timing position estimation error dT caused by the frequency offset according to the normalized frequency offset df and the root index value u of each preamble subsequence;
determining a real timing position TA of the Round Trip Time (RTT) real according to the timing location TA and the timing position estimation error dT of each preamble subsequence;
a transceiver configured to receive and transmit data under the control of the processor to perform processes of:
receiving and transmitting data according to the processor's requirement.

14. The device of claim 13, wherein the root index value u is configured at a network side.

15. The device of claim 13, wherein the processor is further configured to determine a timing position estimation error dT caused by the frequency offset according to the normalized frequency offset df and the root index value u of each preamble subsequence by way of:
$dT(m)=df/u(m)$, wherein $dT(m)$ is a timing position estimation error of an $m^{th}$ preamble subsequence, and $u(m)$ is a root index value of the $m^{th}$ preamble subsequence.

16. The device of claim 15, wherein the processor is further configured to omit the mod(N_ZC) operation according to ZC sequence characteristics when $dT(m)=df/u(m)$.

17. The device of claim 13, wherein the processor is further configured to solve $dT(m)$ jointly according to the relationship of K TA(m) values and the root index value u when the preamble sequence includes M preamble subsequences, wherein $2 \leq K \leq M$.

* * * * *